Patented Jan. 18, 1938

2,105,840

UNITED STATES PATENT OFFICE 2,105,840

VAT DYESTUFFS OF THE PYRAZINOAN-THRAQUINONE SERIES

Heinrich Neresheimer and Wilhelm Ruppel, Ludwigshafen-on-the-Rhine, Germany, assignors to General Aniline Works, Inc., New York, N. Y., a corporation of Delaware No Drawing. Application March 23, 1936, Serial No. 70,406. In Germany March 28, 1935

5 Claims.  (Cl. 260—29)

The present invention relates to new vat dyestuffs.

We have found that new, valuable vat dyestuffs are obtained by causing aromatic or heterocyclic amines containing at least one hydrogen atom combined with nitrogen to act on Pz.5.6-dihalogen-1.2-pyrazino-anthraquinones:—

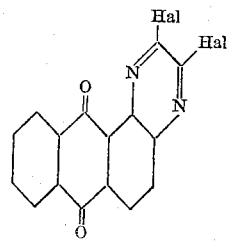

The said initial materials may be obtained, for example, by treating Pz-dihydroxy-pyrazino-anthraquinone with phosphorus pentahalides. Depending on the nature and amount of the amine employed and on the reaction conditions, either one halogen atom or both halogen atoms are replaced by amine radicals. In the former case, compounds which contain two different radicals attached to the Pz-nucleus may also be obtained by subsequent reaction with another amine of the said kind.

By the reaction of one molecular proportion of dihalogen-pyrazino-anthraquinone with one molecular proportion of an ortho-diamine, ring closure may also take place with the splitting off of two molecular proportions of hydrogen halide, a dihydroazine ring probably being formed. By working under milder conditions, such as, for example, at low temperatures, the reaction may in some cases lead to the splitting off of only one molecular proportion of hydrogen halide.

Thus for example by heating dichlor-pyrazino-anthraquinone with an excess of aniline at about 70° C., a bluish-red vat dyestuff is obtained, which has been formed by the replacement of both chlorine atoms by aniline radicals. If one molecular proportion of the said dichloro compound be heated in nitrobenzene with one molecular proportion of 1-amino-5-benzoylaminoanthraquinone at about 110° C., there is first formed a vat dyestuff containing chlorine and yielding orange dyeings.

The following examples will further illustrate how the said invention may be performed in practice, but the invention is not restricted to these examples. The parts are by weight.

Example 1

A mixture of 10 parts of Pz.5.6-dichlorpyrazinoanthraquinone (obtainable by heating Pz-dihydroxy-1.2-pyrazinoanthraquinone with an excess of phosphorus pentachloride at about 150° C. in the presence of nitrobenzene) and 100 parts of aniline is heated at about 100° C. until the reaction is completed. After cooling, the compound separated in an almost quantitative yield in the form of bluish red needles is filtered off by suction, washed with ethanol and dried. According to analysis it is a dianilinopyrazinoanthraquinone and dyes cotton fast bluish red shades from a red vat.

A similar dyestuff is obtained by employing for example meta-toluidine instead of aniline.

Instead of Pz.5.6-dichlorpyrazinoanthraquinone the corresponding dibromo compound (obtainable by using phosphorus pentabromide as the halogenating agent in the abovementioned reaction) may be employed as starting material.

Example 2

A solution of 1.1 parts of para-phenylene diamine in 30 parts of nitrobenzene is slowly added at about 185° C. to a solution of 3 parts of Pz.5.6-dichlorpyrazinoanthraquinone in 20 parts of nitrobenzene. The mixture is stirred for some hours at from 185° to 190° C. After cooling, the violet dyestuff is filtered off by suction, washed with nitrobenzene, ethanol, dilute hydrochlorid acid and water and dried. It dyes cotton red-violet shades from a yellow-red vat.

If 0.9 part of benzidine be employed instead of para-phenylene diamine, a brown-violet dyestuff is obtained which dyes cotton from a yellow-red vat somewhat more bluish shades than the dyestuff obtainable according to the first paragraph of this example.

Example 3

A mixture of 22.3 parts of 1-aminoanthraquinone, 33.1 parts of Pz.5.6-dichlorpyrazinoanthraquinone and 550 parts of nitrobenzene is heated for some hours at from 120° to 130° C.

After cooling to 100° C., the resulting dyestuff is filtered off by suction and washed with warm nitrobenzene and ethanol. Orange needles are obtained in a good yield. According to analysis, they have been formed from one molecule of 1-aminoanthraquinone and 1 molecule of Pz.5.6-dichlorpyrazinoanthraquinone by the splitting off of 1 molecule of hydrogen chloride. The compound dyes cotton orange shades from a red-violet vat.

If 2-aminoanthraquinone be used instead of 1-aminoanthraquinone and the same procedure be followed, an orange crystalline dyestuff of corresponding composition is obtained which dyes cotton also orange shades from a wine-red vat.

If 10 parts of this compound which still contains an exchangeable chlorine atom be boiled with 100 parts of aniline, a bluish red compound is obtained which yields bluish red dyeings from the vat.

If the 1-aminoanthraquinone be replaced by 26 parts of 1-chlor-2-aminoanthraquinone and the reaction be carried out at about 100° C., yellow needles of a compound are obtained which according to analysis has been formed from 1 molecule of 1-chlor-2-aminoanthraquinone and 1 molecule of Pz.5.6-dichlorpyrazinoanthraquinone by the splitting off of 1 molecule of hydrogen chloride. It dyes cotton powerful yellow shades from a yellowish red vat.

In the same way, 1 molecular proportion of 1.4-diaminoanthraquinone may be caused to react at from 115° to 120° C. with 1 molecular proportion of Pz.5.6-dichlorpyrazinoanthraquinone. A dyestuff is thus obtained which dyes cotton violet shades from a wine-red vat.

Example 4

A mixture of 3.4 parts of 1-amino-5-benzoyl-aminoanthraquinone, 3.3 parts of Pz.5.6-dichlor-pyrazinoanthraquinone and 15 parts of nitrobenzene is heated for several hours at about 100° C. The orange needles of the resulting dyestuff are filtered off by suction while hot, washed and dried. According to analysis it still contains 1 atom of chlorine and dyes cotton reddish orange shades from a red-violet vat.

The reaction may also be carried out with 1-amino-4-benzoylaminoanthraquinone. By working at about 80° C., bluish red needles are obtained which dye cotton powerful bluish red shades from a violet vat.

By employing the equivalent amount of 1-amino-4-methoxyanthraquinone instead of the 1-amino-5-benzoylaminoanthraquinone specified in the first paragraph of this example, a ruby-red vat dyestuff is obtained.

Pz.5.6-dibromopyrazinoanthraquinone may also be used as starting material.

Example 5

A mixture of 6.8 parts of 1-amino-4-benzoyl-aminoanthraquinone, 3.3 parts of Pz.5.6-dichlor-pyrazinoanthraquinone and 15 parts of nitrobenzene is heated at from 140° to 145° C. until no further change can be observed. By cooling, blue-violet needles are deposited which are filtered off by suction at about 100° C., washed and dried. The dyestuff dyes cotton red-violet shades from a violet vat, the shades being considerably more bluish than those obtainable with the dyestuff according to the second paragraph of Example 4.

In the same way, if a mixture of 4.5 parts of 2-aminoanthraquinone, 3.3 parts of Pz.5.6-dichlorpyrazinoanthraquinone and 8 parts of nitrobenzene be heated, a compound free from chlorine is obtained in the form of orange-red crystal grains which dye cotton brownish orange shades from a wine-red vat. According to analysis this compound has been formed from 2 molecules of 2-aminoanthraquinone and 1 molecule of Pz.5.6-dichlorpyrazinoanthraquinone by splitting off two molecules of hydrogen chloride.

Example 6

A mixture of 4.8 parts of 1.2-diaminoanthraquinone, 6.6 parts of Pz.5.6-dichlorpyrazinoanthraquinone and 150 parts of nitrobenzene is heated for some hours at 110° C. The dyestuff filtered off after cooling consists beside a little amount of a blue dyestuff substantially of a compound containing chlorine and dyes cotton from a red brown vat brown shades.

Example 7

2.5 parts of 5-aminoanthrapyrimidine are introduced at 110° C. into a solution of 3.3 parts of Pz.5.6-dichlorpyrazinoanthraquinone in 75 parts of nitrobenzene, the mixture is stirred for an hour at the said temperature and the temperature is then slowly raised to 140° C. After some hours the whole is allowed to cool to 100° C. and the resulting red-brown needles are filtered off by suction and washed with nitrobenzene and ethanol. They dye cotton powerful yellowish red shades from a wine-red vat.

Example 8

1.9 parts of Pz.5.6-dichlorpyrazino-4-nitroan-thraquinone (obtainable by the nitration of Pz-dihydroxypyrazinoanthraquinone in concentrated nitric acid and treatment of the nitro compound in nitrobenzene with phosphorus pentachloride) are stirred at ordinary temperature into 20 parts of aniline. After some time, brick-red crystals separate out; after some hours, these are filtered off by suction and washed with aniline and ethanol. The dyestuff thus obtained dyes grey shades having a tinge of violet from a wine-red vat with the conversion of the nitro group into an amino group.

Example 9

1.9 parts of Pz.5.6-dichlorpyrazino-4-nitroan-thraquinone are ground with 2 parts of para-phenylenediamine and 20 parts of nitrobenzene in a ball mill at room temperature until the initial material has disappeared. The dark violet dyestuff is filtered off by suction and washed with nitrobenzene and ethanol. It dyes cotton bluish violet shades from a red vat.

Example 10

6.3 parts of 1.2-diamino-3-bromanthraquinone are introduced at 80° C. into a suspension of 6.6 parts of Pz-dichlor-1.2-pyrazinoanthraquinone in 120 parts of nitrobenzene. The mixture is heated at 100° C. until hydrogen chloride no longer escapes. After cooling, the brown needles of the dyestuff formed are filtered off by suction, washed with nitrobenzene and ethyl alcohol and dried. The dyestuff dissolves in concentrated sulphuric acid giving a yellow-brown coloration and dyes cotton brown shades from a red-brown vat.

Similar dyestuffs are obtained by using, instead of 1.2-diamino-3-bromanthraquinone, 1.2-diam-ino-4-chloranthraquinone (obtainable by nitrating 1-benzoylamino-4-chloranthraquinone in the presence of acetic anhydride, saponifying the benzoylamino group by means of concentrated sulphuric acid and reducing the nitro group; when recrystallized from monochlorbenzene, the compound forms bluish red needles) or 2.3-diaminoanthraquinone.

Example 11

2.4 parts of 1.2-diaminoanthraquinone are introduced, while stirring, at about 100° C. into a suspension of 3.6 parts of 3-chlor-Pz-dichlor-1.2-pyrazinoanthraquinone (obtainable by reacting 1.2-diamino-3-bromanthraquinone with oxalic acid and heating the reaction product with an excess of phosphorus pentachloride, bromine being thereby simultaneously replaced by chlorine; when recrystallized from nitrobenzene, the compound forms colorless needles) in 60 parts of nitrobenzene. The mixture is then heated at between 140° to 150° C. for some hours, violet laminae being formed with the evolution of hydrogen. They are filtered off by suction at about 100° C., washed with ethyl alcohol and dried. The dyestuff thus obtained dissolves in concentrated sulphuric acid giving a yellow-red color and dyes cotton dull blue shades from a red-violet vat.

Example 12

6.3 parts of 1.2-diamino-3-bromanthraquinone are introduced at 80° C. into a solution of 7.8 parts of 3-chlor-Pz-dichlor-1.2-pyrazinoanthraquinone in 120 parts of nitrobenzene. The resulting mixture is heated at 110° C. for some hours, while stirring, brown needles separating out which are filtered off by suction at about 110° C., washed with alcohol and dried. They dissolve in sulphuric acid giving a yellow-brown color and dye cotton red-brown shades from a brown-red vat.

Example 13

6.5 parts of Pz-dichlor-1.2-pyrazinoanthraquinone are added at about 120° C. to a solution of 5 parts of 1-amino-2-methoxyanthraquinone in 150 parts of nitrobenzene. The mixture is heated to boiling for some hours, then allowed to cool and the resulting brown dyestuff is filtered off by suction, washed with ethyl alcohol and dried. It dissolves in concentrated sulphuric acid giving a yellow-brown coloration and dyes cotton red shades from a red-brown vat.

Example 14

1.3 parts of 1.2-diaminoanthraquinone are added at 100° C. to a solution of 2 parts of 4-chlor-Pz-dichlor-1.2-pyrazinoanthraquinone (obtainable from 1.2-diamino-4-chloranthraquinone according to the method described in Example 11; when recrystallized from nitrobenzene the compound forms practically colorless needles). The mixture is heated at between 120° and 130° C. for some hours while stirring, the olive-brown needles obtained being filtered off by suction, washed with ethyl alcohol and dried. The dyestuff dissolves in sulphuric acid giving a red-brown color and dyes cotton olive grey shades from a red-brown vat.

What we claim is:

1. Vat dyestuffs of the pyrazinoanthraquinone series corresponding to the general formula

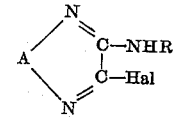

wherein A stands for a radical of an anthraquinone to which the pyrazino ring shown is attached in 1.2-position, and R for an aryl group selected from the class consisting of benzene and anthraquinone radicals.

2. Vat dyestuffs of the pyrazinoanthraquinone series corresponding to the general formula

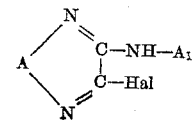

wherein A and $A_1$ stand for radicals of anthraquinones, the pyrazino ring being attached to A in 1.2-position.

3. The vat dyestuff of the pyrazinoanthraquinone series corresponding to the formula

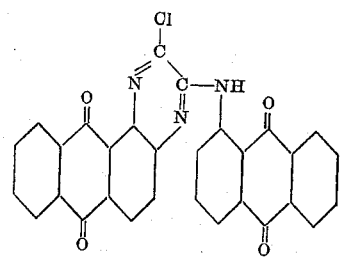

4. The vat dyestuff of the pyrazinoanthraquinone series corresponding to the formula

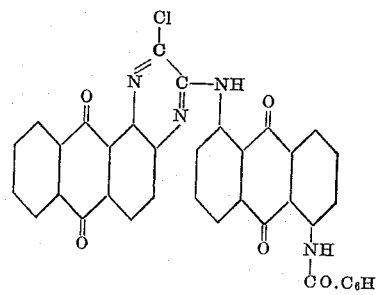

5. The vat dyestuff of the pyrazinoanthraquinone series corresponding to the formula

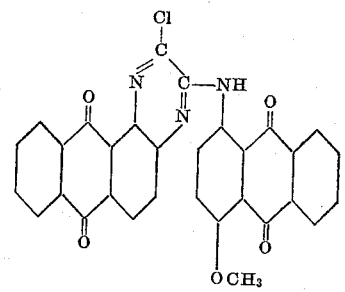

HEINRICH NERESHEIMER.
WILHELM RUPPEL.